(12) United States Patent
Lin et al.

(10) Patent No.: US 8,696,036 B2
(45) Date of Patent: Apr. 15, 2014

(54) METHOD AND APPARATUS FOR CONNECTING PIPING

(75) Inventors: Michael Lin, Livingston, NJ (US); Lei Zhang, Tianjin (CN)

(73) Assignee: J-M Manufacturing Company, Inc., Livingston, NJ (US)

( * ) Notice: Subject to any disclaimer, the term of this patent is extended or adjusted under 35 U.S.C. 154(b) by 378 days.

(21) Appl. No.: 12/522,533

(22) PCT Filed: Jan. 18, 2008

(86) PCT No.: PCT/US2008/051422
§ 371 (c)(1),
(2), (4) Date: Jul. 16, 2010

(87) PCT Pub. No.: WO2008/089400
PCT Pub. Date: Jul. 24, 2008

(65) Prior Publication Data
US 2011/0041314 A1    Feb. 24, 2011

(30) Foreign Application Priority Data

Jan. 19, 2007   (CN) .................. 2007 2 0095006 U (51) Int. Cl.
*F16L 33/00*   (2006.01)
(52) U.S. Cl.
USPC ....................... 285/256; 29/525.05
(58) Field of Classification Search
USPC ............... 29/525.05; 285/255, 256, 259, 243, 285/242, 252, 149, 382.2
See application file for complete search history.

(56) References Cited

U.S. PATENT DOCUMENTS

| | | | |
|---|---|---|---|
| 2,614,304 A * | 10/1952 | Oetiker | ........................ 24/20 R |
| 3,893,718 A | 7/1975 | Powell | |
| 4,011,652 A | 3/1977 | Black | |
| 4,221,407 A | 9/1980 | Steimle | |
| 4,312,101 A | 1/1982 | Oetiker | |
| 4,538,837 A | 9/1985 | Cronk | |
| 4,948,178 A | 8/1990 | Sauer | |
| 5,082,315 A * | 1/1992 | Sauer | ............................ 285/256 |
| 5,228,721 A * | 7/1993 | Whittle et al. | .................. 285/23 |
| 5,339,496 A * | 8/1994 | Oetiker | ..................... 24/20 CW |
| 6,095,571 A | 8/2000 | MacDuff | |
| 6,481,764 B1 | 11/2002 | Kwok | |
| 6,523,862 B1 * | 2/2003 | MacDuff | ....................... 285/256 |
| 6,719,330 B2 * | 4/2004 | Brown et al. | ................. 285/242 |
| 7,661,720 B2 * | 2/2010 | Nakano et al. | ................ 285/242 |
| 2003/0230132 A1 | 12/2003 | Bowles et al. | |
| 2004/0211467 A1 | 10/2004 | Lechuga | |
| 2005/0275221 A1 | 12/2005 | Rehder et al. | |
| 2006/0151995 A1 | 7/2006 | Saarem | |

OTHER PUBLICATIONS

Official Action issued May 8, 2012, in counterpart Mexican Patent Application.
Official Action issued Feb. 25, 2013, in counterpart Mexican Patent Application.
Official Action issued Aug. 14, 2013, in counterpart Mexican Patent Application No. MX/a/2009/006173.

* cited by examiner

*Primary Examiner* — Lee D Wilson
*Assistant Examiner* — Steven A Maynard
(74) *Attorney, Agent, or Firm* — Duane Morris LLP (57) ABSTRACT

A piping connector is provided having a ring configured to install around an external diameter of a pipe, the ring having at least one clamp closing portion that has an open uncrimped position and a closed crimped position, a piping shield connected to the ring, the piping shield having at least one penetration to accept the at least one clamp closing portion, wherein the piping shield covers an abutment end of the pipe to be connected, wherein a joint between the ring and the piping shield forms a connection.

7 Claims, 11 Drawing Sheets

METHOD AND APPARATUS FOR CONNECTING PIPING

CROSS-REFERENCE TO RELATED APPLICATIONS

The following application claims priority to Chinese Patent Application 200720095006.7, filed Jan. 19, 2007, which is included by reference in its entirety.

FIELD OF THE INVENTION

The present invention relates to piping connections. More specifically, the present invention provides a piping connection that provides a secure connection between the individual piping sections to be joined.

BACKGROUND INFORMATION

Connection of pipe is an important function in creating a piping system. Piping systems may be used, for example, for transport of materials, such as fluids and gases. These piping systems may be manufactured of differing materials such as, plastic, iron, copper or other similar materials.

Connection of piping materials can prove to be difficult. Conventional techniques include various crimping technologies that exert tremendous force upon the ends of piping but have a limited effect on providing a leak-free seal. Such connections often include provision of a spool piece inside the inner diameter of piping sections to be joined, wherein the outer piping system is then crimped around the spool piece to provide a mechanical connection.

Although well intentioned, conventional techniques used for creation of piping connections have significant drawbacks. Such significant drawbacks can include inaccurate crimping of the piping system, thereby allowing fluids, such as liquids and gases, to escape from the piping system. An additional significant drawback includes the use of highly specialized tools to prevent significant over crimping of the piping system. The specialized tools can be extremely expensive and cumbersome and cannot be used in tight quarters or in areas of limited accessibility.

To overcome these significant drawbacks, other conventional techniques include soldering and\or welding of pipe sections together may be used. While welding of the individual piping sections is an acceptable technique for providing a proper mechanical connection, the costs associated with welding of the piping system can be extremely high. Thus, when a significant number of welds is to occur in a piping system, such as in a new home placement, or in an industrial setting, the cost of piping insulation can skyrocket leaving the owner of the piping system with little alternative but to pay for expensive mechanical connections.

There is therefore a need to provide a mechanical connection that will connect different sections of a piping system.

There is a further need to provide a mechanical connection that will connect different sections of the piping system in an economical manner.

There is a still further need to provide a mechanical connection that may be installed in a piping system with a minimum of specialty tools.

There is still further need to provide a simple connection for use in a piping system that may be used by installers without the need for special training. There is a further need to provide a simple connection that may be used with pipe or tubing to create piping/tubing systems. There is also a need to provide an arrangement and method of connecting pipe or tubing such that galvanic corrosion is minimized and/or eliminated.

SUMMARY OF THE INVENTION

It is therefore an objective of an aspect of the present invention to provide a mechanical connection that will connect different sections of a piping system.

It is also an objective of an aspect of the present invention to provide a mechanical connection that will connect different sections of the piping system in an economical manner.

It is a further objective of an aspect of the present invention to provide a mechanical connection that may be installed in a piping system with a minimum of specialty tools.

Is a still further objective of an aspect of the present invention to provide a simple connection for use in a piping system that may be used by installers without the need for special training. It is also an objective of an aspect of the invention to provide a simple connection that may be used with pipe or tubing to create piping/tubing systems. It is also an objective of the invention to provide an arrangement and method of connecting pipe or tubing such that galvanic corrosion is minimized and/or eliminated.

The objectives of the present invention are achieved as illustrated and described. In an exemplary embodiment of the invention, a piping connection is provided, the piping connection having a ring configured to install around an external diameter of a pipe, the ring having at least one clamp closing portion that has an open uncrimped position and a closed crimped position, and a piping shield connected to the ring, the piping shield having at least one penetration to accept the at least one clamp closing portion, wherein the piping shield covers an abutment end of the pipe to be connected, wherein a joint between the ring connector and the piping shield forms a connection.

In another exemplary embodiment of the present invention the piping connection is provided wherein the connection formed between the piping shield and the ring is a groove arrangement.

In an alternative embodiment, the piping shield is configured of plastic.

The piping connector may also be configured wherein the piping shield has at least two penetrations. Additionally, the piping connector may be configured wherein the ring has two clamp closing portions, each of the clamp closing portions penetrating a penetration of the piping shield.

The piping connector may also be configured wherein the ring is made of stainless steel material or wherein the ring is made of copper.

The piping connector may also be configured wherein the piping shield has a front face that extends over the abutment end of the pipe.

In an alternative embodiment of the invention, a method is presented to connect a pipe and a fitting together, comprising steps of placing a piping connector over an abutment end of a first piece of pipe, the piping connector having a ring and a shield, the ring having at least one clamp closing portion penetrating the shield, inserting a fitting into the abutment end, crimping the at least one clamp closing portion of the piping connector to deform the piping around the spool piece, wherein the piping connector has a ring connector configured to snugly fit around an external diameter of a pipe, wherein a piping shield is connected to the ring, the piping shield having at least one penetration cut into the shield, wherein the piping shield covers the abutment end of the pipe to be connected, and wherein a joint between the ring and the piping shield forms a connection.

In another exemplary embodiment of the invention the method is accomplished such that the connection between the piping shield and the ring is a groove arrangement.

In another exemplary embodiment of the invention, the method may be accomplished such that the piping shield is made of plastic.

In another exemplary embodiment of the invention, the method may be accomplished such that the ring connector is made of stainless steel material.

In a still further exemplary embodiment of the invention, the method may be accomplished wherein the ring connector is made of copper.

In another exemplary embodiment, the method may be accomplished wherein the piping shield has a front face that extends over the abutment end of the pipe.

In a still further exemplary embodiment of a method of the present invention, the fitting has a ribbed surface.

BRIEF DESCRIPTION OF THE DRAWINGS

FIG. 2b is a side view of a ring connector of FIG. 2a.

FIG. 3b is side view of the shield of FIG. 3a.

FIG. 4a is side view of the both the shield and an installed ring according to FIG. 1a.

DETAILED DESCRIPTION

Figure 1A:
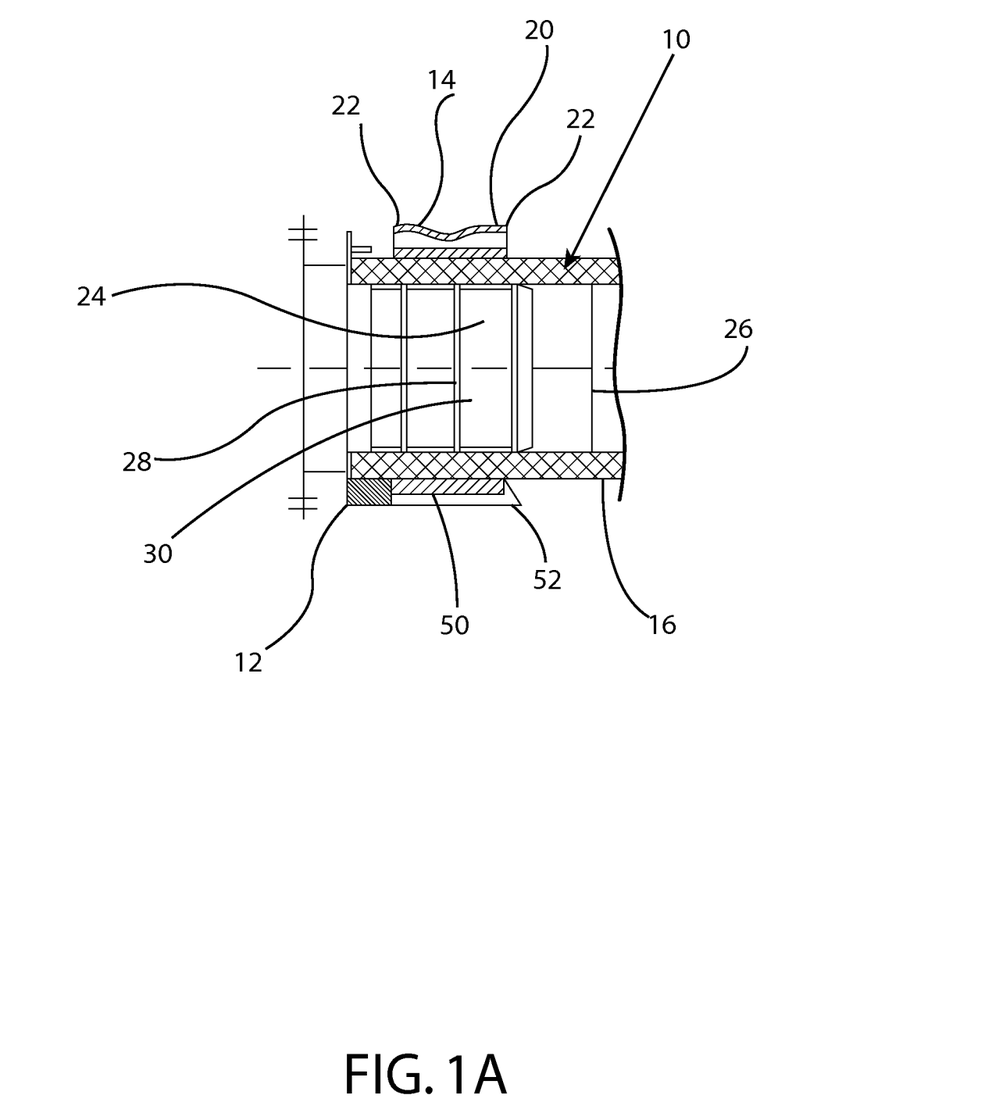
FIG. 1a is a side view of the piping connection on a pipe in accordance with an embodiment of the present invention.
Figure 1B:
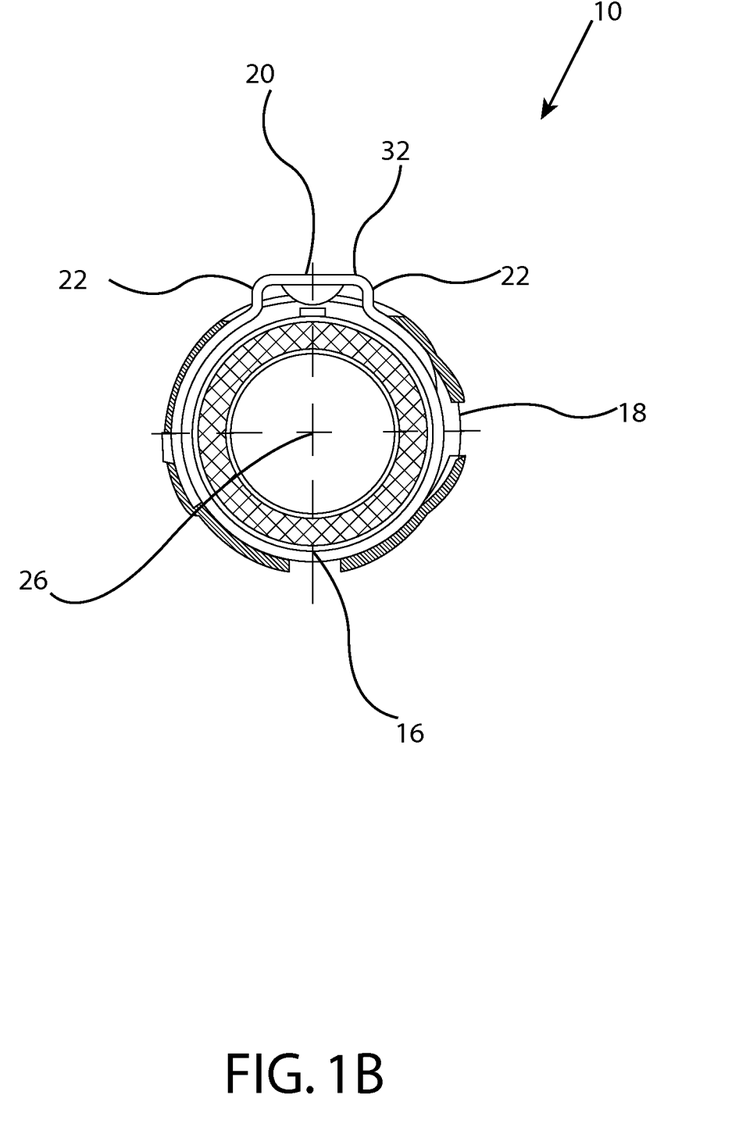
FIG. 1b is a front view of the piping connection of FIG. 1a in an unclosed state installed on a pipe.
Figure 1C:
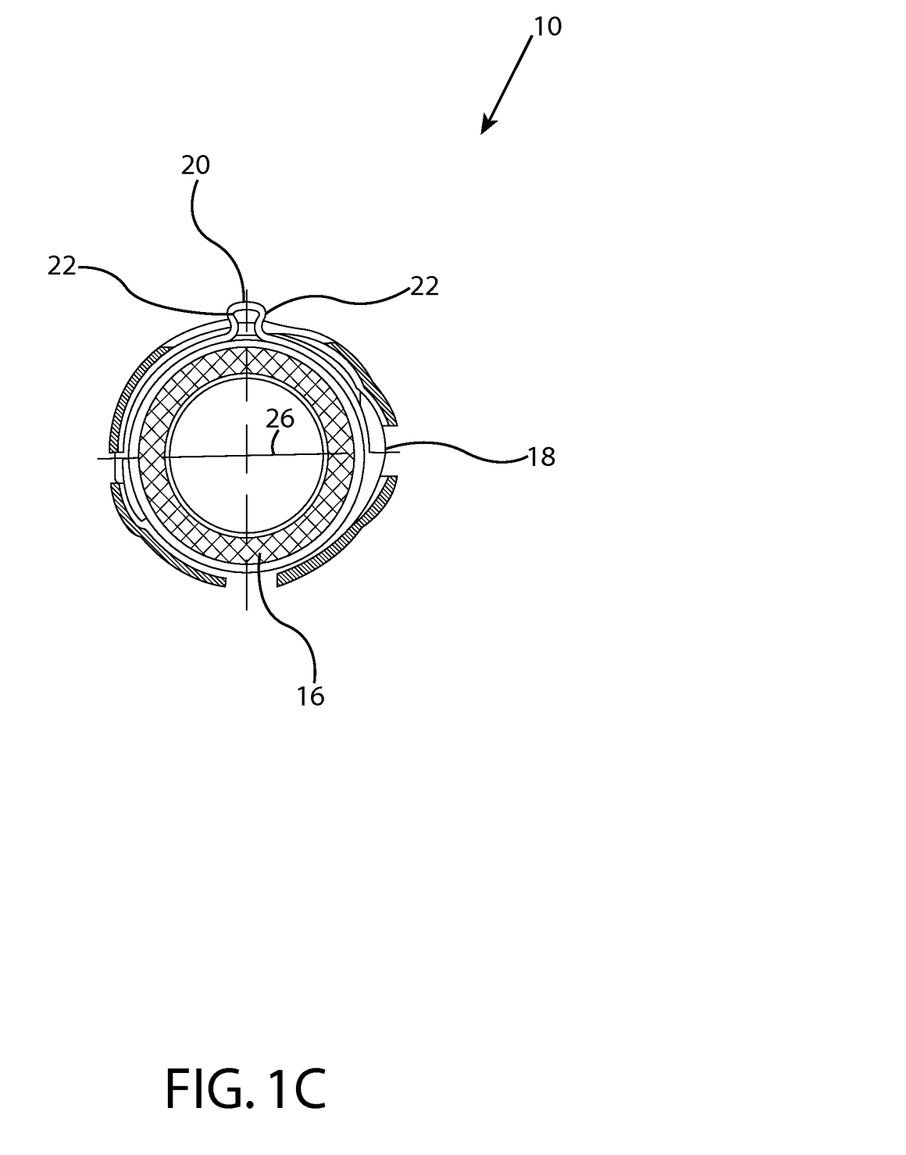
FIG. 1c is front view of the piping connection of FIG. 1a in a closed state installed on a pipe.

Referring to FIGS. 1a, 1b and 1c, a piping connector 10 is provided. The piping connector 10 is used to connect pipes together to create a piping systems through the attaching the pipe to an insert. In the exemplary embodiment, two main elements of the piping connector 10 are provided, namely a shield 12 and an ring 14. The ring may be an Oetiker type clamp, in an exemplary embodiment. Referring to FIG. 1a, a side view of the piping connector 10 is illustrated installed on a pipe 16. FIG. 1b illustrates the piping connector 10 of FIG. 1a from a front view without ring 14 compression (an uninstalled state). FIG. 1c illustrates the piping connector 10 front view with the ring 14 in a compressed state. As provided in FIG. 1a, the shield 12 installs upon the ring 14 allowing portions of the ring 14 to penetrate portions of the shield 12. The penetrations 18 provided in the shield 12 are sufficiently sized to allow portions of the ring 14 such as a clamp closing portion 20 to protrude through the shield 12.

The clamp closing portion 20, in a closed position, provides the ring 14 the ability to be tightened around the pipe 16 allowing the pipe to clenched by the contracting ring 14, in the illustrated embodiments, a connection is established between a fitting and the internal diameter of the pipe. If a large amount of clamp force is desired, the ring 14 may be configured with a large clamp closing portion 20 allowing greater draw up on the ring. By placing a force on alternating sides 22 of the clamp closing portion 20, the amount of material within the ring 14 fitting around the pipe 16 is contracted, allowing the piping connection 10 to compress the pipe 16 around a fitting 24 placed within the pipe 16. This compression of the piping connection 10 around the pipe 16 allows for a friction fit between the fitting 24 and the inside diameter 26 of the pipe 16. Fitting 24 may be an insert with ribs 28 along the length of the shank 30.

Figure 2A:
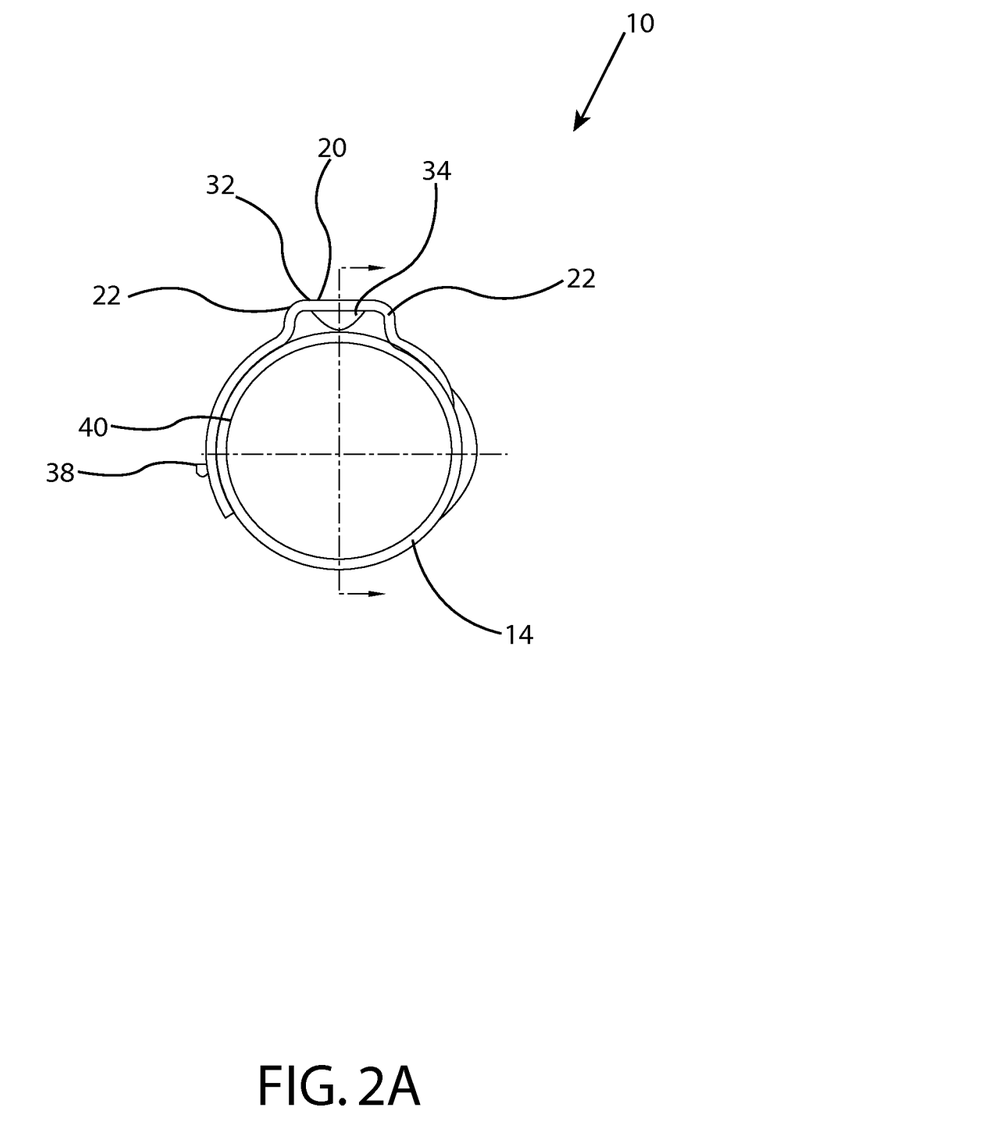
FIG. 2a is a front view of the ring connector not installed on a pipe.
Figure 2B:
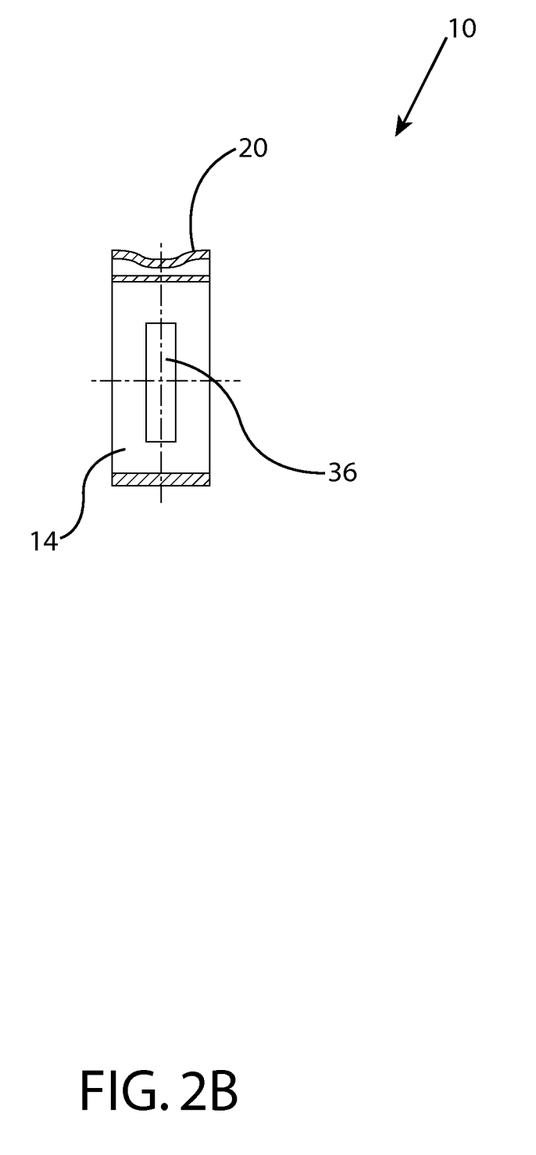
Figure 2C:
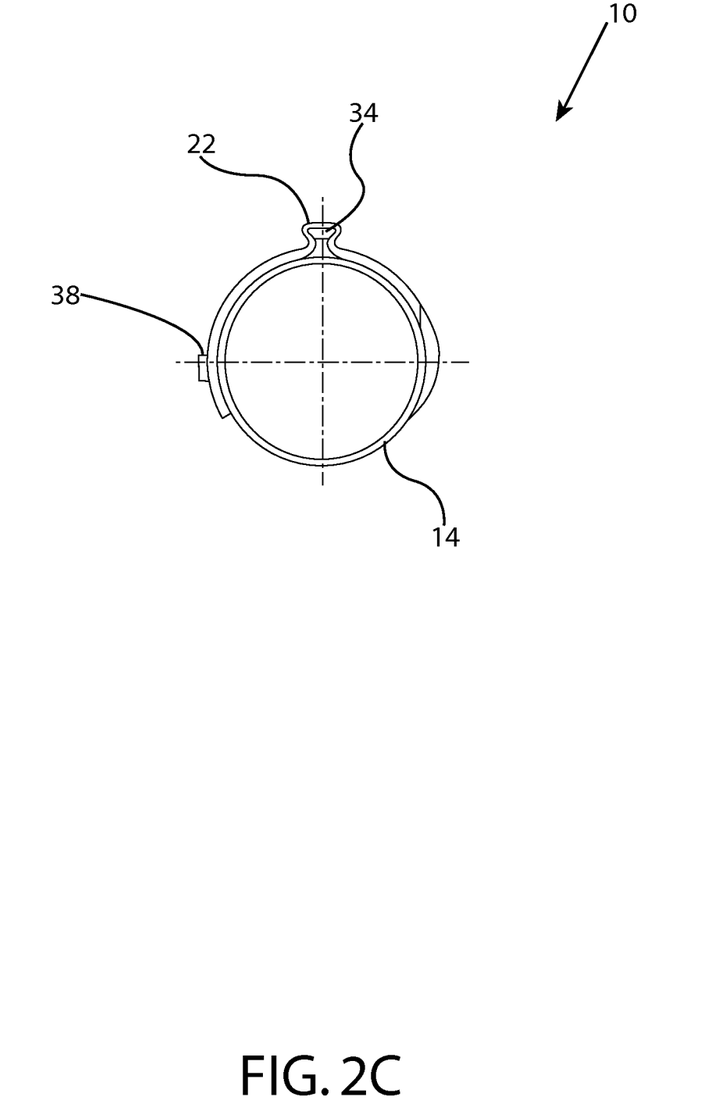
FIG. 2c is a front view of a ring connection in an uninstalled condition, with a closed configuration.

Referring to FIGS. 2a, 2b and 2c, a ring 14 of the piping connection 10 is illustrated. The ring 14 is configured with a clamp closing portion 20. The clamp closing portion 20 has an elevated table 32 with an interior bubble 34 of material. Upon a closing force directed on opposite sides of the clamp closing portion 20, the sides collapse around the interior bubble 34 of material. The sides of the ring 14, therefore, tighten around the interior diameter of the ring 14 constricting the space enclosed therein, as provided in FIG. 2c. As provided in FIG. 2b, the ring 14 is configured with a penetration 36, as needed, to accept a stud piece 38 that may be connected to an inner ring 40 of the ring 14. The stud piece 38 provides for limits on constriction of the ring 14 during tightening.

Figure 3A:
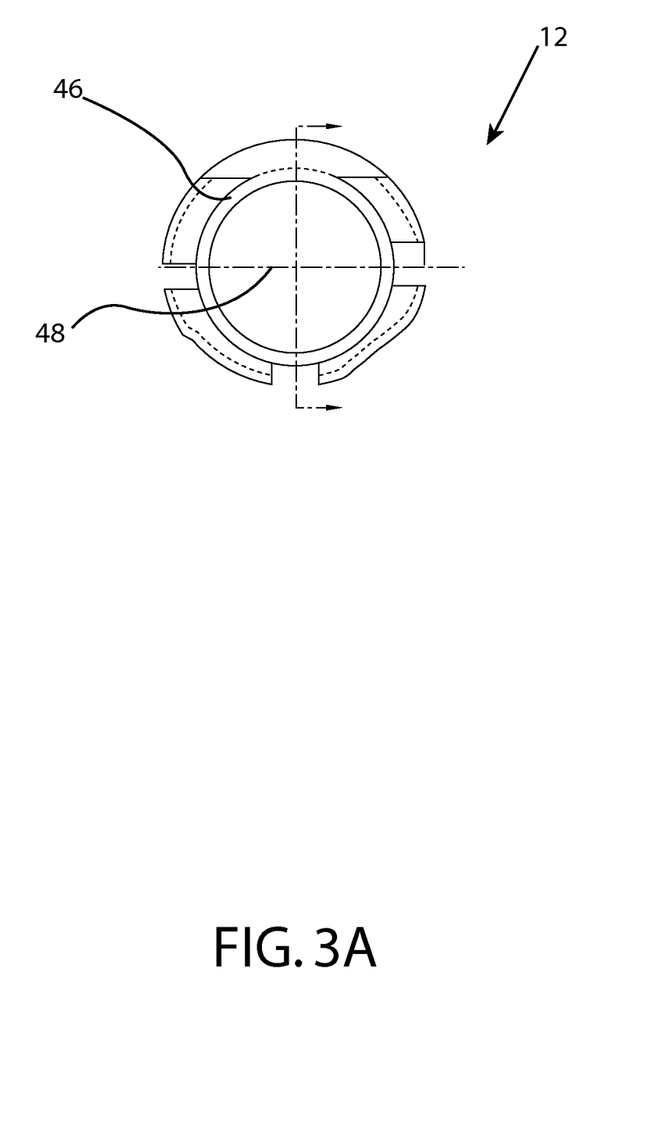
FIG. 3a is a front view of a shield of the piping connector of FIGS. 1a through 1c.
Figure 3B:
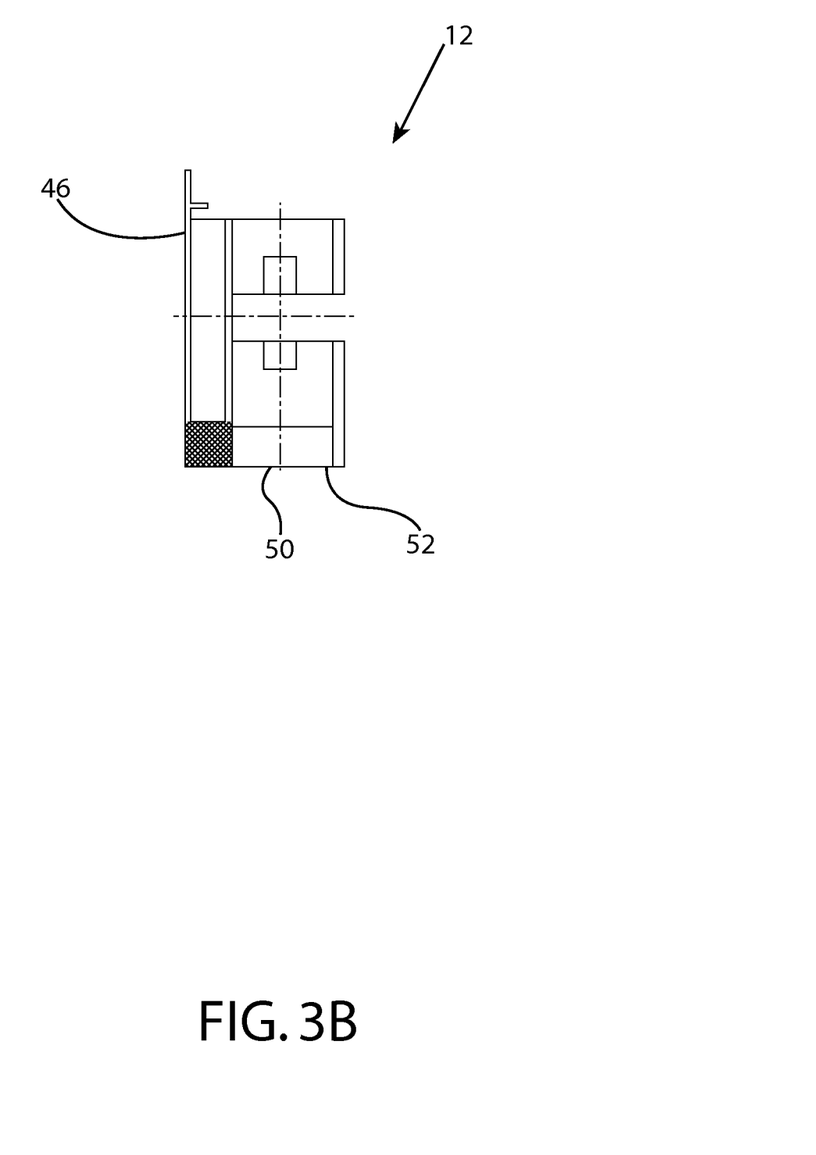

Referring to FIGS. 3a and 3b, the shield 12 is provided as separated from the ring 14. The shield 12 has a leading edge 46 that is configured to fit against an abutment end of a pipe that is to be connected to the fitting. The shield 12 is made of plastic in the exemplary embodiment, however other materials may also be used. The shield 12 is further configured with an open area diameter 48. The ring 14 is configured to fit within the body of the shield 12 and is connected through a groove connection 50 with locking flange 52.

The material from which the shield is made provides for prevention of dissimilar metals contacting, thereby enhancing galvanic corrosion. To prevent the galvanic corrosion, the shield may be made of plastic, as in the exemplary embodiment. Alternative embodiments may use a material that is similar to the piping to be connected, thereby minimizing dissimilar metals.

Figure 4A:
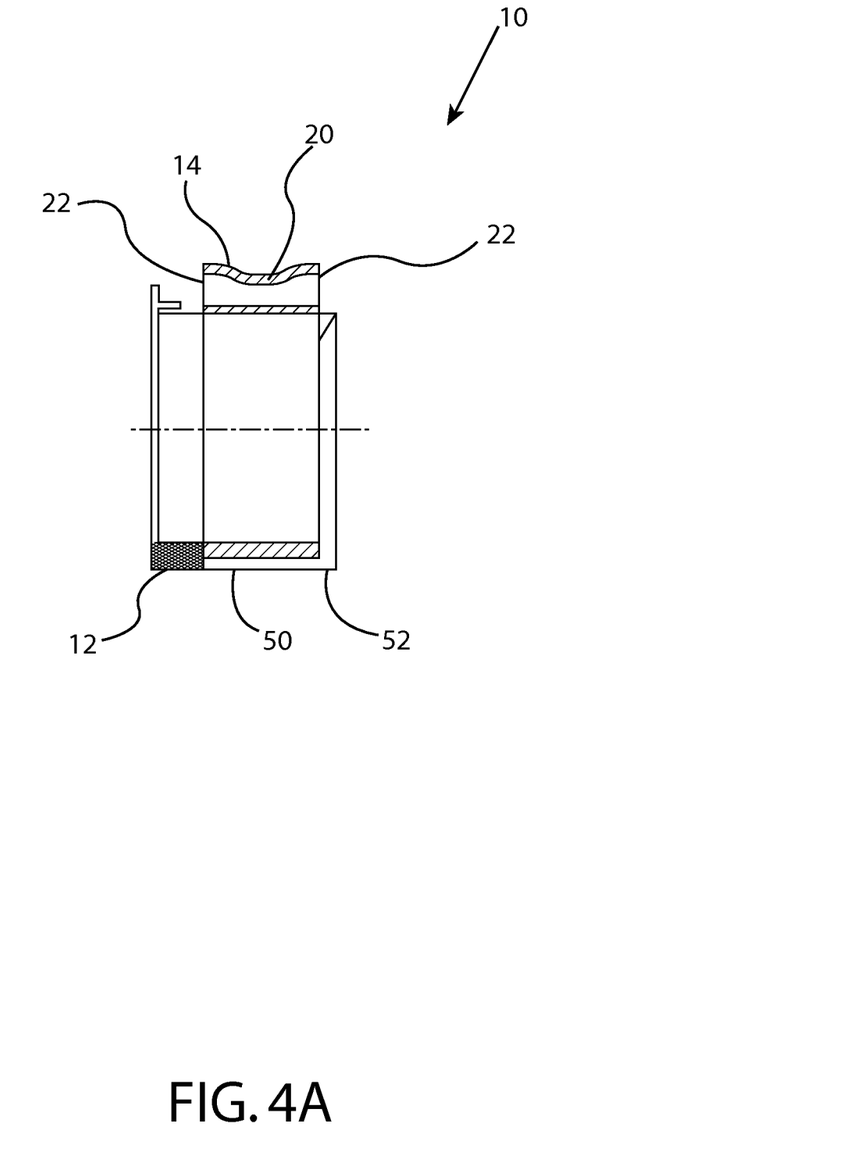
Figure 4B:
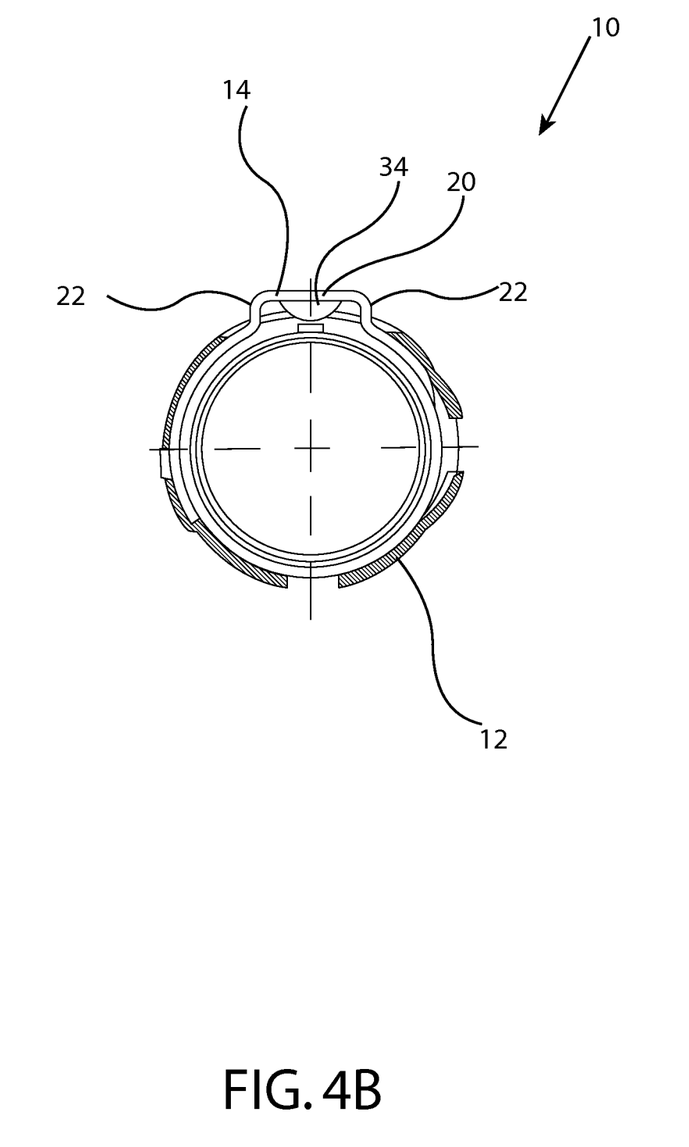
FIG. 4b is a front view of the piping connection of FIG. 4a in an uninstalled condition.

Referring to FIGS. 4a and 4b, an assembled piping connection 10 is illustrated. As provided in the side view in FIG. 4a and the front view in FIG. 4b, the ring 14 is enclosed by the shield 12 on the front and back ends.

Figure 5:
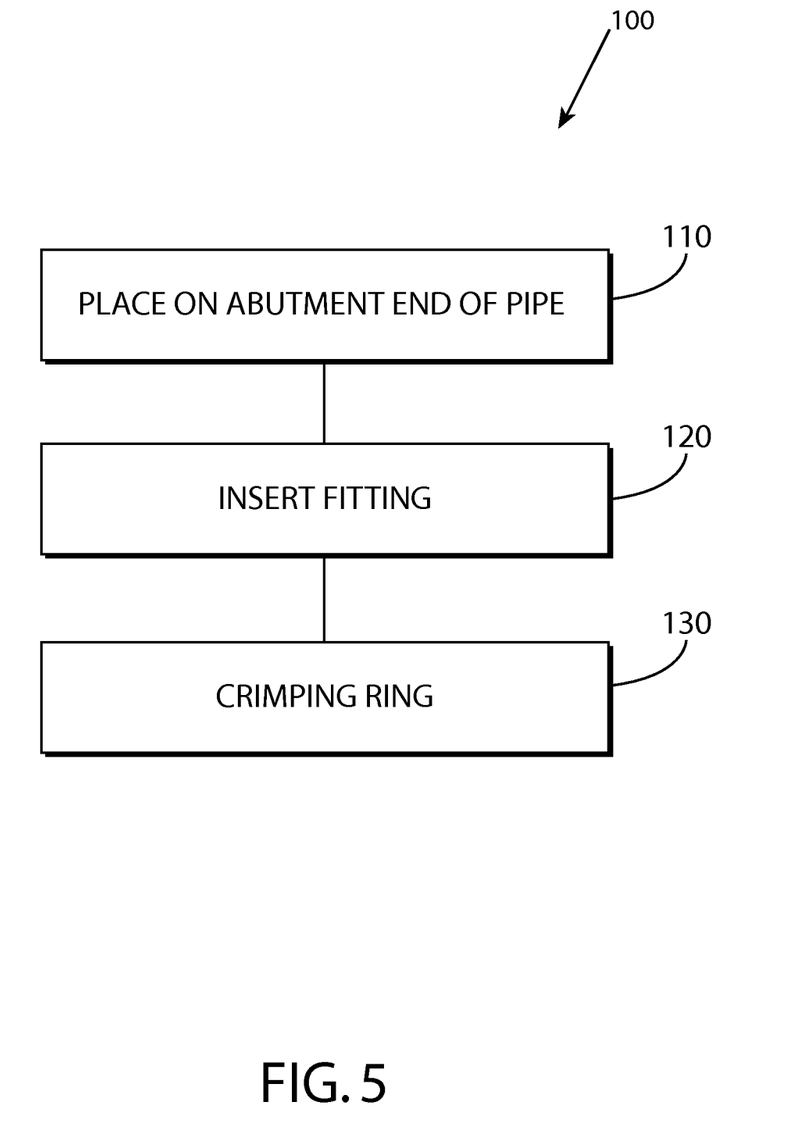
FIG. 5 is a flow chart of a method to connect piping, in conformance with an exemplary embodiment of the invention.

Referring to FIG. 5, a method 100 for connecting a pipe and a fitting together is provided. The method 100 involves the steps of placing a piping connector over an abutment end of a first piece of pipe, the piping connector having a ring and a shield, the ring having at least one clamp closing portion penetrating the shield 110 and inserting a fitting into the abutment end 120. The method then entails the step of crimping the at least one clamp closing portion of the piping connector to deform the piping around the fitting 130, wherein the piping connector has a ring connector configured to snugly fit around an external diameter of a pipe, wherein a piping shield is connected to the ring, the piping shield having at least one penetration cut into the shield, wherein the piping shield covers the abutment end of the pipe to be connected, and wherein a joint between the ring connector and the piping shield forms a connection.

The present invention provides a mechanical connection that will connect piping together to form a piping system. The connection established is through fittings thereby allowing any number of pipes to be connected together, provided that the fitting allows for such a number of connections. The invention provides a simple connection that may be used with pipe or tubing to create piping/tubing systems. The invention also provides an arrangement and method of connecting pipe or tubing such that galvanic corrosion is minimized and/or eliminated.

The present invention provides a mechanical connection that will allow an installer to connect different sections of the piping system in an economical manner, with little training, thus eliminating the need for expensive welding of piping systems as performed in conventional systems.

The method and apparatus of the present invention provides a mechanical connection for a piping system without specialty tools. A simple crimping device, such as a pair of pliers will allow for quick connection of spool pieces to the piping system, thereby saving installers economic expense.

The present invention also provides a simple connection for use in a piping system that may be used by installers with a minimum of training. Thus, individuals such as apprentices, may easily connect sections of pipe together without the need for specialized training.

What is claimed is:

1. A piping connector, comprising:
   a ring configured to install around an external diameter of a pipe, the ring having at least one clamp closing portion that has an open uncrimped position and a closed crimped position, the ring including at least one penetration sized and configured to receive a stud piece therein; and a piping shield configured to be connected to the ring such that substantially all of the ring is disposed within an internal diameter of the piping shield, the piping shield including a front face configured to extend over an abutment end of a pipe and defining at least one penetration sized and configured to receive the at least one clamp closing portion of the ring therethrough such that the at least one clamp closing portion of the ring is accessible externally of the piping shield,
   wherein the stud piece extends from an inner ring of the ring and is configured to provide a limit of tightening the ring.

2. The piping connector according to claim 1, wherein the connection formed between the piping shield and the ring is a groove arrangement.

3. The piping connector according to claim 1, wherein the piping shield is made of plastic.

4. The piping connector according to claim 1, wherein the piping shield has at least two penetrations.

5. The piping connector according to claim 4, wherein the ring has at least two clamp closing portions, each of the clamp closing portions penetrating a penetration of the piping shield.

6. The piping connector according to claim 1, wherein the ring is made of stainless steel material.

7. The piping connector according to claim 1, wherein the ring is made of copper.

* * * * *